United States Patent
Hwang et al.

(10) Patent No.: US 10,472,262 B2
(45) Date of Patent: Nov. 12, 2019

(54) ELECTRICAL-STORAGE TYPE DESALINATION ELECTRODE MODULE, PRODUCTION METHOD THEREFOR AND DESALINATION DEVICE USING SAME

(71) Applicant: AMOGREENTECH CO., LTD., Gimpo-si (KR)

(72) Inventors: Jun Sik Hwang, Incheon (KR); In Yong Seo, Seoul (KR)

(73) Assignee: AMOGREENTECH CO., LTD., Gimpo-si (KR)

(*) Notice: Subject to any disclaimer, the term of this patent is extended or adjusted under 35 U.S.C. 154(b) by 940 days.

(21) Appl. No.: 15/045,452

(22) Filed: Feb. 17, 2016

(65) Prior Publication Data
US 2016/0159667 A1 Jun. 9, 2016

Related U.S. Application Data

(63) Continuation-in-part of application No. PCT/KR2014/008636, filed on Sep. 17, 2014.

(30) Foreign Application Priority Data

Sep. 17, 2013 (KR) .................. 10-2013-0111546
Sep. 17, 2014 (KR) .................. 10-2014-0123315

(51) Int. Cl.
*C02F 1/46* (2006.01)
*C02F 1/469* (2006.01)

(52) U.S. Cl.
CPC ................. *C02F 1/4691* (2013.01)

(58) Field of Classification Search
CPC ............... C02F 1/4691; C02F 2305/08; C02F 2303/04; C02F 2101/20; C02F 1/505; C02F 1/281; C02F 2001/46133
See application file for complete search history.

(56) References Cited

U.S. PATENT DOCUMENTS 8,213,156 B2 * 7/2012 Mitchell ................ H01G 9/155
361/502

FOREIGN PATENT DOCUMENTS

| KR | 100501417 | 7/2005 |
|---|---|---|
| KR | 20050075811 | 7/2005 |
| KR | 100716206 | 5/2007 |
| KR | 100798429 | 1/2008 |
| KR | 100869941 | 11/2008 |
| KR | 20090041637 | 4/2009 |
| KR | 20090067149 | 6/2009 |
| KR | 100988032 | 10/2010 |

(Continued)

OTHER PUBLICATIONS

International Search Report—PCT/KR2014/008636 dated Dec. 3, 2014.

*Primary Examiner* — Arun S Phasge
(74) *Attorney, Agent, or Firm* — Cantor Colburn LLP

(57) ABSTRACT

Provided are a capacitive deionization electrode module, a method of manufacturing the same, and a deionization apparatus using the same. The capacitive deionization electrode module includes: a conductive support that is formed by injecting and fixing carbon-based electrode powders into and to fine pores of a porous substrate; and a coating layer coated on one surface of the conductive support, to thereby implement a current collector for the deionization apparatus having ultra-thin, slim, and excellent flexible features.

5 Claims, 5 Drawing Sheets

(56) References Cited

FOREIGN PATENT DOCUMENTS

| | | |
|---|---|---|
| KR | 20110016213 | 2/2011 |
| KR | 101147156 | 5/2012 |
| WO | 2015041453 | 3/2015 |

* cited by examiner

ELECTRICAL-STORAGE TYPE DESALINATION ELECTRODE MODULE, PRODUCTION METHOD THEREFOR AND DESALINATION DEVICE USING SAME

TECHNICAL FIELD

The present invention relates to a capacitive deionization electrode module, and more specifically, to a capacitive deionization electrode module enabling fabrication of an ultra-thin film and slimming thereof and having excellent flexibility by applying a nanofiber web or non-woven fabric as a conductive support, a method of manufacturing the capacitive deionization electrode, and a deionization apparatus using the same.

BACKGROUND ART

In general, only 0.0086% of all the earth's water volume can be used. When considering disasters due to climate change in mind, water is not available enough.

Water is very important to human life and can be used variously as water for living or industrial water. Water may be contaminated with heavy metals, nitrate, fluoride, etc., due to industrial development and it is very harmful to health to drink contaminated water.

Recently, deionization technologies for purifying contaminated water and sea water for use as agricultural, industrial, or irrigation water have been variously studied.

These deionization technologies are techniques for deionization or desalination of water by removing various suspended solids or ion components contained in the sea water or polluted water such as waste water, and may employ an evaporation method to evaporate water by using a heat source such as fossil fuels or electric power, a filtration method to filter and remove foreign materials by using a separation membrane, or an electrodialysis method to remove ions by using an electrolytic action of an electrode cell.

The evaporation method evaporates moisture by using fossil fuels or electricity as a heat source, is inefficient due to the large volume of the deionization equipment, increases the manufacturing cost due to an increase in the consumption of energy, and causes contamination of air due to the use of fossil fuels.

The filtration method removes foreign matters by applying a high pressure to a separator and thus the cost of energy increases.

The electrodialysis method has to constantly replace an electrode cell with another, and does not only generate a waste factor due to the replacement of the electrode cell but also has the disadvantage of increasing human and material incidental expenses in accordance with the replacement of the electrode cell.

Korean Patent Registration Publication No. 501417 discloses a waste water deionization apparatus using a reverse osmosis membrane method/electrode method, the waste water deionization apparatus comprising: a reverse osmosis membrane device to primarily remove salt components from water to be treated in which the water to be treated is introduced with a predetermined pressure into the reverse osmosis membrane device; an deionization electrode device that secondarily removes salt components from the water that has been primarily processed in the reverse osmosis membrane device in which a spacer, a positive electrode and a negative electrode are sequentially provided in a cylindrical tank; an energy recovery device for utilizing a brine-side pressure of the reverse osmosis membrane device for use to pressurize inlet water of the deionization electrode device; a power supply device for supplying power to the positive electrode and the negative electrode provided in the deionization electrode device; and a controller for controlling valves provided in pipes through which the water to be process in order to perform a deionization process for deionizing the water to be treated in which the water to be treated is introduced into the deionization electrode device, and a reproduction processor desorbing ions adsorbed to the electrode during the deionization process. However, such a waste water deionization apparatus includes the reverse osmosis membrane device and the deionization electrode device individually and thus may cause the large size of the deionization unit and require a lot of manufacturing cost.

Thus, the present inventors have constantly proceeded a study on a technique of slimming a deionization device and reducing a production cost, to thus invent and derive structural features of a current collector module capable of implementing an ultra-thin film type current collector simultaneously having a high capacitance, to thereby have completed the present invention that is more economical, and possibly utilizable, and competitive.

SUMMARY OF THE INVENTION

To solve the above problems or defects, it is an object of the present invention to provide a capacitive deionization electrode module capable of reducing a manufacturing cost and having a high storage capacity by employing a conductive support that is formed by fixing carbon-based electrode powders to fine pores of a porous substrate as a current collector, a method of manufacturing the capacitive deionization electrode, and a deionization apparatus using the same.

It is another object of the present invention to provide a capacitive deionization electrode module, a method of manufacturing the same, and a deionization apparatus using the same, in which a current collector is ultra-thinned to slim the deionization apparatus.

It is still another object of the present invention to provide a capacitive deionization electrode module, a method of manufacturing the same, and a deionization apparatus using the same that can implement a flexible current collector module.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided a capacitive deionization electrode module comprising: a conductive support that is formed by injecting and fixing carbon-based electrode powders into and to fine pores of a porous substrate; and a coating layer coated on one surface of the conductive support.

In addition, according to another aspect of the present invention, there is provided a method of manufacturing a capacitive deionization electrode module, the method comprising the steps of: preparing a porous substrate having fine pores; injecting a carbon-based electrode powder slurry into the fine pores of the porous substrate in which the carbon-based electrode powder slurry is formed by mixing carbon-based electrode powders with a solvent together with a binder; fixing the carbon-based electrode powders to the fine pores of the porous substrate; and forming a coating layer on the porous substrate to the fine pores of which the carbon-based electrode powders are fixed.

Furthermore, according to still another aspect of the present invention, there is provided a deionization apparatus comprising: a first capacitive deionization electrode module including a first conductive support that is formed by injecting and fixing carbon-based electrode powders to fine pores of a porous substrate; and a first coating layer coated on one surface of the first conductive support; and a second capacitive deionization electrode module including a second conductive support that is formed by injecting and fixing other carbon-based electrode powders to fine pores of another porous substrate; a second coating layer coated on one surface of the second conductive support, in which the second capacitive deionization electrode module faces the first capacitive deionization electrode module while interposing a space between the first capacitive deionization electrode module and the second capacitive deionization electrode module; and a non-woven fabric that is located in a space between the first and second capacitive deionization electrode modules and through which water to be treated passes.

As described above, the present invention configures a capacitive deionization electrode module made of a conductive support including a porous substrate to fine pores of which carbon-based electrode powders are fixed, and a coating layer, to thus have advantages of ultra-thinning and slimming the capacitive deionization electrode module.

In the present invention, a nanofiber web or non-woven fabric having excellent flexibility can be prepared as a conductive support, to thereby provide advantages of implementing a flexible capacitive deionization electrode module and simultaneously mounting the flexible capacitive deionization electrode module even on a deionization apparatus of a curved shape.

In addition, in the present invention, a conductive support is prepared by fixing carbon-based electrode powders having excellent electrical conductivity to fine pores of a porous substrate, to thereby reduce a manufacturing cost and have a high storage capacity.

DETAILED DESCRIPTION OF THE INVENTION

Figure 1:
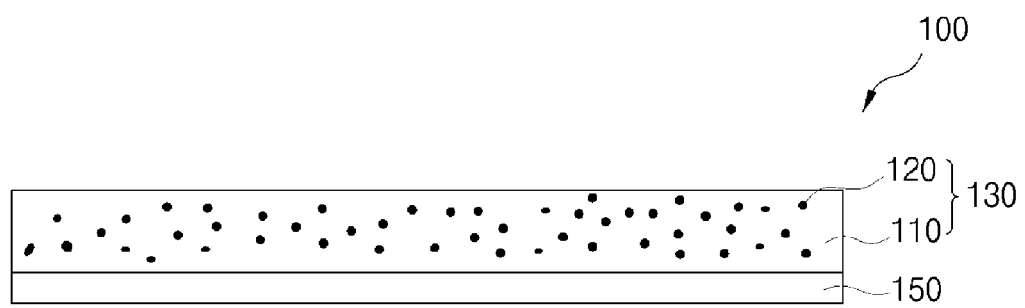
FIG. 1 is a schematic cross-sectional view illustrating a capacitive deionization electrode module according to an embodiment of the present invention.

Hereinafter, embodiments of the present invention will be described in detail with reference to the accompanying drawings. In the process, the size and shape of the components illustrated in the drawings may be exaggerated for convenience and clarity of explanation. Further, by considering the configuration and operation of the present invention, the specifically defined terms can be changed according to user's or operator's intention, or the custom. Definitions of these terms herein need to be made based on the contents across the whole application.

Figure 2:
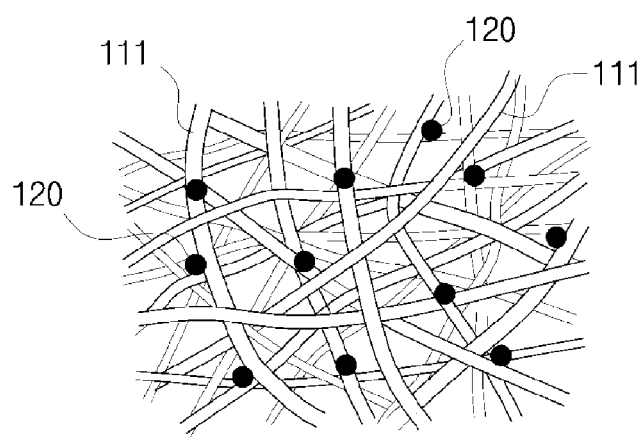
FIG. 2 is a conceptual view for explaining that carbon-based electrode powders are dispersed in a nanofiber web that is applied to an embodiment of the present invention.

FIG. 1 is a schematic cross-sectional view illustrating a capacitive deionization electrode module according to an embodiment of the present invention, and FIG. 2 is a conceptual view for explaining that carbon-based electrode powders are dispersed in a nanofiber web that is applied to an embodiment of the present invention.

Referring to FIG. 1, a capacitive deionization electrode module 100 according to a preferred embodiment of the invention includes: a conductive support 130 that is formed by injecting and fixing carbon-based electrode powders 120 to fine pores of a porous substrate 110 such as a porous nanofiber web or non-woven fabric; and a coating layer 150 coated on one surface of the conductive support 130.

Here, the carbon-based electrode powders 120 are mixed with a binder and a solvent to prepare a carbon-based electrode powder slurry in which the carbon-based electrode powders 120 are distributed, and then the carbon-based electrode powder slurry is injected into and fixed to fine pores of the porous substrate 110.

In this case, the carbon-based electrode powders 120 are locked in and fixed to the fine pores of the porous substrate 110. Here, the binder may be interposed between the carbon-based electrode powders 120 and the porous substrate 110, and increase a binding force of fixing the carbon-based electrode powders 120 to the porous substrate 110.

As will be described later, the conductive support 130 has a structure that the carbon-based electrode powders 120 are injected into and fixed to the porous substrate 110 such as a porous nanofiber web or non-woven fabric to ensure electrical conductivity, in which the porous substrate 110 is prepared by: dissolving a polymer that can be electrospun in a solvent to thus form a spinning solution; electrospinning the spinning solution on a collector or a transfer sheet, and accumulating the electrospun nanofibers, to thereby obtain the porous substrate 110 having fine pores.

This capacitive deionization electrode module 100 may ensure excellent electrical conductivity while maintaining flexibility, since the conductive support 130 has a structure that the fine carbon-based electrode powders 120 are injected into and fixed to the porous substrate 110 such as a porous nanofiber web or non-woven fabric that includes fine pores that are formed by accumulating the electrospun nanofibers. Therefore, the capacitive deionization electrode module 100 according to the embodiment of the present invention functions as a flexible current collector.

In addition, the capacitive deionization electrode module 100 according to the embodiment of the present invention includes a coating layer 150 that is formed on the conductive support 130, to thus enable an ultra-thin film to be made, to thereby reduce the size of the deionization device and have good electrical conductivity.

When the porous nanofiber web is applied as a porous substrate 110 of the conductive support 130, the carbon-based electrode powders 120 injected into the porous nanofiber web are dispersed to the outer sides of nanofibers 111, as shown in FIG. 2. In this case, since the porous nanofiber web is formed by stacking the nanofibers 111 and the fine pores are formed by the stacked nanofibers 111, the injected carbon-based electrode powders 120 are injected into and fixed to the inner sides of the porous nanofiber web along the fine pores. Meanwhile, the carbon-based electrode powders 120 may be fixed to inlets of the fine pores outwardly from the nanofibers 111 by a binder. In the end, most of the carbon-based electrode powders 120 are fixed to the fine pores made of the nanofibers 111 and are distributed on the porous nanofiber web.

In some embodiments of the present invention, the capacitive deionization electrode module made of a conductive support including a porous substrate to fine pores of which carbon-based electrode powders are fixed, and a coating layer, to thus have advantages of ultra-thinning and slimming the capacitive deionization electrode module.

In some embodiments of the present invention, a nanofiber web or non-woven fabric having excellent flexibility can be prepared as the conductive support, to thereby provide advantages of implementing a flexible capacitive deionization electrode module and simultaneously mounting the flexible capacitive deionization electrode module even on a deionization apparatus of a curved shape.

In addition, in some embodiments of the present invention, a conductive support is prepared by fixing carbon-based electrode powders having excellent electrical conductivity to fine pores of a porous substrate, to thereby provide a capacitive deionization electrode module having a high storage capacity at a low cost.

Figure 3A:
FIGS. 3A to 3C are schematic cross-sectional views illustrating a method of manufacturing a capacitive deionization electrode module in accordance with one embodiment of the present invention.
Figure 3B:
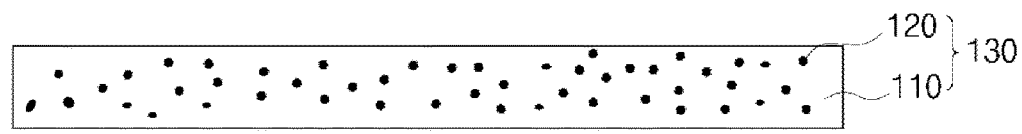
Figure 3C:
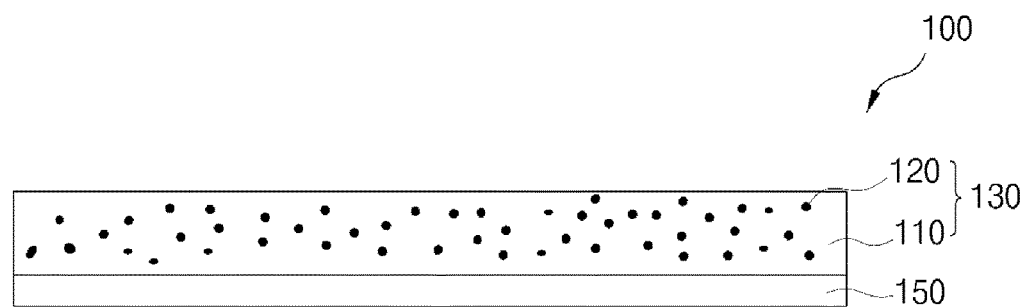

FIGS. 3A to 3C are schematic cross-sectional views illustrating a method of manufacturing a capacitive deionization electrode module in accordance with one embodiment of the present invention.

Referring to FIGS. 3A to 3C, the method of manufacturing a capacitive deionization electrode module in accordance with one embodiment of the present invention includes preparing a porous substrate such as a porous nanofiber web having fine pores or a nonwoven fabric having fine pores in which nanofibers that are formed by air electrospinning a polymer material are stacked (FIG. 3A).

The porous nanofiber web can be obtained by electrospinning a spinning solution that is formed by dissolving a single kind of a polymer or a mixture of at least two kinds of polymers in a solvent, or can be obtained by dissolving respectively different polymers in a solvent and then cross-spinning the electrospun spinning solution through respectively different spinning nozzles.

When forming a mixed spinning solution by using two types of polymers, for example, in the case of mixing PAN as a heat-resistant polymer and PVDF as an adhesive polymer (or a water-swellable polymer), it is preferable to mix both in a range of 8:2 to 5:5 at a weight ratio.

In the case that a mixing ratio of the heat-resistant polymer and the adhesive polymer is less than 5:5 at a weight ratio, heat resistance performance of the mixed spinning solution falls to thus fail to exhibit required high temperature properties. On the contrary, in the case that a mixing ratio of the heat-resistant polymer and the adhesive polymer is larger than 8:2 at a weight ratio, the intensity of the mixed spinning solution falls to thereby cause a spinning trouble to occur.

When preparing a spinning solution by using a mixed polymer of a heat-resistant polymer material and a swellable polymer material in some embodiments of the present invention, a single solvent or a two-component mixed solvent that is formed by mixing a high boiling point solvent and a low boiling point solvent can be employed. In this case, a mixing ratio of the two-component mixed solvent and the entire polymer material is preferably set to a weight ratio of about 8:2.

In some embodiments of the present invention, considering that the solvent volatilization may not be well achieved depending on the type of the polymer when using a single solvent, it can be designed to pass through a pre-air dry zone by a pre-heater after a spinning process, and undergo a process of adjusting the amount of the solvent and moisture remaining on the surface of the porous web, as will be described later.

Any polymers may be used in the case of fiber forming polymers that can be dissolved in a solvent to thus form a spinning solution, and then spun in an electrospinning method to thus form nanofibers.

The heat-resistant polymer resin that may be used in the present invention is a resin that can be dissolved in an organic solvent for electrospinning and whose melting point is 180° C. or higher, for example, any one selected from the group consisting of: aromatic polyester containing at least one of polyacrylonitrile PAN, polyamide, polyimide, polyamide-imide, poly meta-phenylene iso-phthalamide, polysulfone, polyether ketone, polyethylene terephthalate, polytrimethylene terephthalate, and polyethylene naphthalate; polyphosphazenes containing at least one of polytetrafluoroethylene, polydiphenoxy phosphazene, and poly {bis [2-2-methoxyethoxy phosphazene]}; polyurethane copolymer containing at least one of polyurethane and polyether urethane; cellulose acetate, cellulose acetate butylrate, and cellulose acetate propionate.

The swellable polymer material that may be used in the present invention is a resin that is swollen in an electrolyte, and may be formed into an ultrafine fiber by an electrospinning method, for example, any one selected from the group consisting of: polyvinylidene fluoride PVDF, poly vinylidene fluoride-co-hexafluoropropylene, perfluoropolymer, polyvinyl chloride or polyvinylidene chloride, and copolymer thereof; polyethylene glycol derivatives containing at least one of polyethylene glycol dialkylether and polyethylene glycol dialkyl ester; polyoxide containing at least one of poly oxymethylene-oligo-oxyethylene, polyethylene oxide and polypropylene oxide; polyacrylonitrile copolymer containing at least one of polyvinyl acetate, poly vinyl pyrrolidone-vinyl acetate, polystyrene, polystyrene acrylonitrile copolymer, and polyacrylonitrile methyl methacrylate copolymer; and polymethyl methacrylate, and polymethyl methacrylate copolymer, and any one combination thereof.

The porous nanofiber web is made of ultra-fine nanofibers that are formed by dissolving a single or mixed polymer in a solvent to thus form a spinning solution, and spinning the spinning solution, and then calendered at a temperature below or equal to a melting point of the polymer there by adjusting sizes of the pores and thickness of the web.

The porous nanofiber web is formed of, for example, nanofibers to have a diameter of 0.3 to 1.5 μm, and are set to 10 to 70 μm thick, preferably set to 20 to 25 μm in thickness. The sizes of the fine pores are set to several tens of micrometers μm, and the porosity is set to 50 to 90%.

In this case, the porous substrate 110 may be formed of a porous non-woven fabric alone or may be formed by laminating porous non-woven fabrics, if necessary, in order to reinforce the strength of the porous nanofiber web and the support. The porous non-woven fabric may employ any one of a nonwoven fabric made of PP/PE fibers of a double structure fiber in which polyethylene (PE) is coated on the outer periphery of polypropylene (PP) fibers, as a core, a polyethylene terephthalate (PET) nonwoven fabric made of PET fibers, and a non-woven fabric made of cellulose fibers.

Thereafter, a carbon-based electrode powder slurry that is formed by mixing the carbon-based electrode powders 120 in a solvent together with a binder is injected into fine pores of the porous substrate 110, to then fix the carbon-based electrode powders 120 to the fine pores of the porous substrate 110 (FIG. 3B). That is, the carbon-based electrode powders 120 are injected into the fine pores of the porous substrate 110 in order to form the conductive support 130. The carbon-based electrode powders 120 formed of several micrometers smaller than the sizes of the fine pores are mixed with a binder in a solvent to thereby form a carbon-based electrode powder slurry, and then the carbon-based electrode powder slurry is injected into the fine pores by coating or spraying the carbon-based electrode powder slurry on both surfaces of the porous substrate 110, or by dipping the porous substrate 110 in the carbon-based electrode powder slurry. In addition, the carbon electrode powders 120 are fixed to the fine pores of the porous substrate 110 by performing one or both of hot-air drying and thermal compressing the injected carbon-based electrode powder slurry, to thus volatilize the solvent.

Each of the carbon-based electrode powders 120 may employ at least one of an activated carbon powder (ACP), a carbon nanotube (CNT) powder, a graphite powder, a vapor-grown carbon fiber (VGCF) powder, a carbon aerogel powder, and a carbon nanofiber (CNF) powder that is prepared by carbonizing a polymer such as poly acrylonitrile (PAN) or polyvinylidene fluoride (PVdF).

In addition, metal powders may be further included in the carbon-based electrode powders 120 to improve electrical conductivity.

Here, the metal powders may be formed by using any metal having excellent electrical conductivity, for example, a metal such as nickel (Ni), copper (Cu), stainless steel (SUS), titanium (Ti), chromium (Cr), manganese (Mn), iron (Fe), cobalt (Co), zinc (Zn), molybdenum (Mo), tungsten (W), silver (Ag), gold (Au), and aluminum (Al).

Then, a coating layer 150 is formed, in an electrolytic plating method or electroless plating method, on the porous substrate 110 to the fine pores of which the carbon-based electrode powders 120 are fixed (FIG. 3C). A coat material of the coating layer 150 is penetrated into the fine pores that are positioned on one side of the porous substrate 110.

Here, before forming the coating layer 150, a process of forming a conductive adhesive layer (not shown) on the porous substrate 110 may be further included in order to facilitate the formation of the coating layer 150. The conductive adhesive layer has a function role of the adhesive layer, and serves to further ensure the conductivity of the coating layer 150.

The conductive adhesive layer is preferably made of the same material as the coating layer, and may be preferably formed into a thickness of less than or equal to 1 μm by a Physical Vapor Deposition (PVD) method such as sputtering, vacuum deposition, or ion plating.

Figure 4:
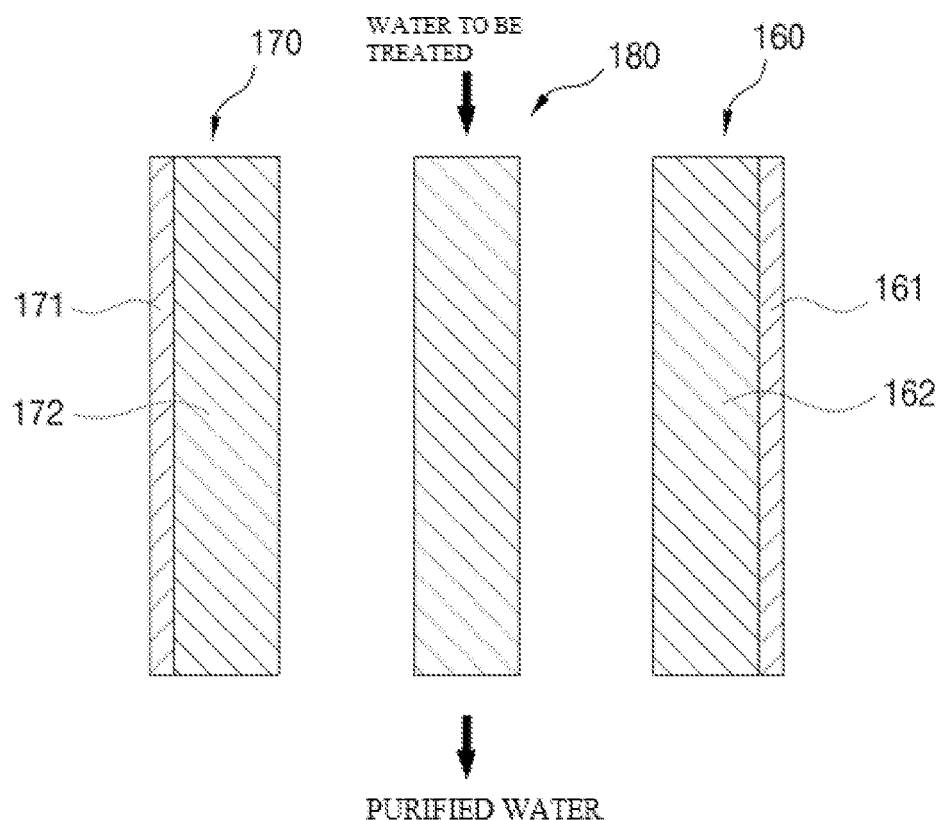
FIG. 4 is a conceptual view for explaining a deionization apparatus according to a first embodiment of the present invention.

FIG. 4 is a conceptual view for explaining a deionization apparatus according to a first embodiment of the present invention.

Referring to FIG. 4, the deionization apparatus according to the first embodiment of the present invention includes: a first capacitive deionization electrode module 160 including a first conductive support 161 that is formed by injecting and fixing carbon-based electrode powders to fine pores of a porous substrate; and a first coating layer 162 coated on one surface of the first conductive support 161; a second capacitive deionization electrode module 170 including a second conductive support 171 that is formed by injecting and fixing other carbon-based electrode powders to fine pores of another porous substrate; and a second coating layer 172 coated on one surface of the second conductive support 171, in which the second capacitive deionization electrode module 170 faces the first capacitive deionization electrode module 160 while interposing a space between the first capacitive deionization electrode module 160 and the second capacitive deionization electrode module 170; and a non-woven fabric 180 that is located in a space between the first and second capacitive deionization electrode modules 160 and 170 and through which water to be treated passes.

The first and second capacitive deionization electrode modules 160 and 170 are current collectors having respectively different polarities or potentials. For example, the first capacitive deionization electrode module 160 is a negative electrode current collector, and the second capacitive deionization electrode module 170 is a positive electrode current collector.

Since a plurality of pores of an irregular shape are formed in the non-woven fabric 180, the direction of flow of water to be treated passed between the first and second capacitive deionization electrode modules 160 and 170 varies in various form, and thus adsorption efficiency of ion scan be increased by a potential applied between the first and second capacitive deionization electrode modules 160 and 170.

When a potential is applied between the first and second capacitive deionization electrode modules 160 and 170, ions included in water to be treated such as sea water or waste water entering one side of the deionization apparatus are adsorbed on the surfaces of the first and second capacitive electrodes deionization modules 160 and 170 and removed from the water to be treated, by electric attraction from an electric double layer formed on the surfaces of the first and second capacitive deionization electrode modules 160 and 170, to thereby discharge purified water through the other side of the deionization apparatus. In this case, by the electric attraction, the carbon-based electrode powders fixed to the fine pores of the porous substrate adsorb ions contained in the water to be treated such as sea water or waste water.

Therefore, the deionization apparatus according to the first embodiment of the present invention implements capacitive deionization by adsorbing ions from water to be treated passing through the non-woven fabric by a potential applied to the first and second capacitive deionization electrode modules 160 and 170.

Then, the deionization apparatus according to the first embodiment of the present invention may implement an ultra-thin deionization apparatus by employing an ultra-thin capacitive deionization electrode module including a conductive support made of a porous substrate to the fine pores of which the carbon-based electrode powder are fixed, and a coating layer, as a current collector.

Meanwhile, the deionization apparatus according to the first embodiment of the present invention may be backwashed by switching the electrode potential to zero volts (V) or the inverse potential when the adsorbed ions reach the capacitance of the capacitive deionization electrode module, thereby desorbing ions adsorbed in the capacitive deionization electrode module to thus be recycled.

Figure 5:
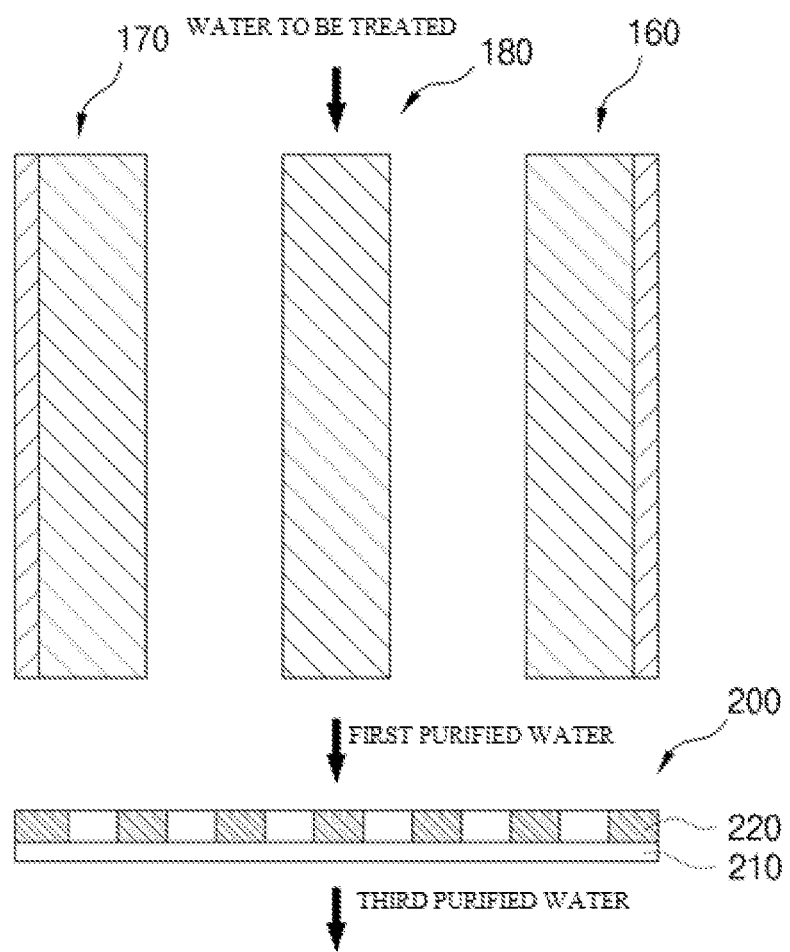
FIG. 5 is a conceptual view for explaining a deionization apparatus according to a second embodiment of the present invention.
Figure 6:
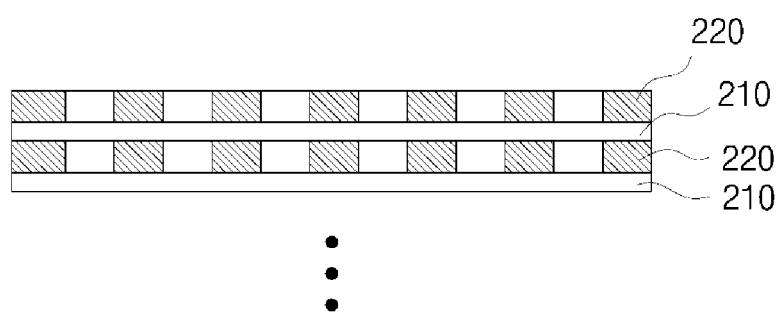
FIG. 6 is a conceptual diagram for explaining a structure that filter modules of FIG. 5 are stacked.

FIG. 5 is a conceptual view for explaining a deionization apparatus according to a second embodiment of the present invention, and FIG. 6 is a conceptual diagram for explaining a structure that filter modules of FIG. 5 are stacked.

Referring to FIG. 5, the deionization apparatus according to the second embodiment of the present invention may further include a filter module 200 to filter out heavy metal ions and bacterial substances on the other end of the deionization apparatus through which purified water is discharged.

The filter module 200 is provided at the other end of the deionization apparatus to eliminate heavy metal ions and bacterial substances such as bacteria and microorganisms. Here, FIG. 5 is a conceptual view, in which the filter module 200 is shown as being spaced from the other end of the deionization apparatus, but is not limited thereto. However, the first and second capacitive deionization electrode modules 160 and 170 should be constructed in a structure for preventing leakage of the first purified water that has passed through between the first and second capacitive deionization electrode modules 160 and 170 by default. For example, the filter module 200 may be in close contact with the other end of the deionization apparatus from which the first purified water is discharged, or a guide for preventing the leakage of the first purified water may be provided between each of the first and second capacitive deionization electrode modules 160 and 170 and the filter module 200.

The filter module 200 includes: a silver (Ag) mesh module 220 for removing heavy metal ions from first purified water that is obtained by removing ions from water to be treated by the first and second capacitive deionization electrode modules 160 and 170; and a nanofiber web 210 that is fixed to the Ag mesh module 220, thereby filtering the bacterial substances from second purified water from which the heavy metal ions have been removed.

Since the fine pores are formed in the nanofiber web 210, the bacterial substances are collected by the nanofiber web 210 while the second purified water passes through the nanofiber web 210, to thereby discharge third purified water.

In addition, as shown in FIG. 6, the filter module 200 may be implemented into a repeatedly laminated structure of the mesh module 220 and the nanofiber web 210 in which the mesh module 220 and the nanofiber web 210 are stacked repeatedly.

Thus, in some embodiments of the present invention, the deionization apparatus further includes the filter module, to thereby filter the heavy metal ions and bacterial substances.

Meanwhile, in some embodiments of the present invention, the nanofiber web 210 can be implemented in a nanofiber web in which the nanofibers containing silver nano-materials are laminated. In other words, purified water having passed through the nanofiber web containing silver nano-materials prevents propagation of bacteria to thus increase the antibacterial properties.

Accordingly, a silver nano-material or a polymer material is dissolved in an organic solvent, to thus prepare a spinning solution, and then the spinning solution is electrospun to thus prepare nanofibers. Then, the nanofibers are laminated to thus prepare a nanofiber web.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention provides an ultra-thin deionization apparatus by employing an ultra-thin capacitive deionization electrode module including a conductive support made of a porous substrate to the fine pores of which the carbon-based electrode powder are fixed, and a coating layer, as a current collector.

The invention claimed is:

1. A capacitive deionization electrode module comprising:
   a conductive support including: a porous substrate having fine pores; and carbon-based electrode powders injected inside the fine pores of the porous substrate, wherein the porous substrate is formed of a nanofiber web, and the nanofiber web is formed of electrospun and accumulated polymer nanofibers; and
   a coating layer coated on one surface of the conductive support.

2. The capacitive deionization electrode module of claim 1, wherein the carbon-based electrode powders include: a binder.

3. The capacitive deionization electrode module of claim 1, wherein the carbon-based electrode powders include at least one selected from the group consisting of an activated carbon powder (ACP), a carbon nanotube (CNT) powder, a graphite powder, a vapor-grown carbon fiber (VGCF) powder, a carbon aerogel powder, and a polymer-carbonized carbon nanofiber (CNF) powder.

4. The capacitive deionization electrode module of claim 3, wherein the carbon-based electrode powders further comprise metal powders.

5. The capacitive deionization electrode module of claim 1, wherein a coating material of the coating layer is penetrated into the fine pores of the porous substrate.

\* \* \* \* \*